United States Patent
Lee

(10) Patent No.: US 6,196,080 B1
(45) Date of Patent: Mar. 6, 2001

(54) SHIFT LEVER UNIT FOR DUAL-MODE AUTOMATIC TRANSMISSION

(75) Inventor: Sang-joo Lee, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/300,890

(22) Filed: Apr. 28, 1999

(30) Foreign Application Priority Data

Aug. 7, 1998 (KR) .................................................. 98-32177

(51) Int. Cl.[7] .......................... F16H 59/02; F16H 63/36; F16H 63/38
(52) U.S. Cl. ..................... 74/473.18; 74/473.25; 74/473.26; 74/473.28
(58) Field of Search .............................. 74/335, 473.24, 74/473.25, 473.26, 473.28

(56) References Cited

U.S. PATENT DOCUMENTS 5,622,079 * 4/1997 Woeste et al. .......................... 74/335
5,799,538 * 9/1998 Dejonge et al. ..................... 74/473.3
5,875,684 * 3/1999 Bravo ................................. 74/473.18

* cited by examiner

Primary Examiner—Allan D. Herrmann
(74) Attorney, Agent, or Firm—Christie, Parker & Hale, LLP

(57) ABSTRACT

Disclosed is a shift/select lever unit for a dual-mode automatic transmission. The shift/select lever unit includes a main frame mounted to a vehicle body; a select lever assembly movable between the automatic and manual modes to select one of the automatic and manual modes, said select lever assembly being shiftable in the automatic and manual modes to change drive modes and ranges; a shift cable bracket connected to a shift cable, said shift cable bracket being engaged with said select lever assembly when said select lever assembly is in the automatic mode and released from said select lever assembly when said select lever assembly is in the manual mode; and means for preventing the shift cable bracket from moving when said select lever assembly is in the manual mode.

15 Claims, 4 Drawing Sheets

SHIFT LEVER UNIT FOR DUAL-MODE AUTOMATIC TRANSMISSION

BACKGROUND OF THE INVENTION (a) Field of the Invention

The present invention relates to a shift/select lever unit for dual-mode automatic transmissions in which both automatic and manual shifting capabilities are provided.

(b) Description of the Related Art

A relatively recent development in the automatic transmission allows for both automatic and manual shifting. That is, the transmission has the conventional automatic modes, but enables manual control in the drive D range so that the driver can have more control over the vehicle. Such an arrangement is more often found in sports vehicles.

A select lever unit used in the dual-mode automatic transmission generally includes a select lever operated by the user to change shift modes and ranges; a cable bracket connected to a shift cable and which is indexed with the select lever when the select lever is in an automatic mode to operate a manual valve of the transmission; and a connecting lever member formed on the select lever to enable the select lever and the cable bracket to move together according to changes in the automatic mode, the cable bracket being provided with a lever connecting hole corresponding to the connecting lever member.

An indentation is provided on an upper portion of the lever connecting hole for insertion of the connecting lever member to fix the connecting lever member's relative motion with respect to the cable bracket along certain directions when the select lever is in the automatic mode, thereby forming an automatic mode range. Also, a bottom portion of the lever connecting hole is realized through a manual mode range having a predetermined width to enable freer movement of the connecting lever member during plus and minus shifting in the case where the select lever is in the automatic shift mode.

Accordingly, the operation of the select lever unit is such that the connecting lever member selectively moves in ranges in the lever connecting hole according to mode changes of the select lever, thereby either transmitting or discontinuing operational force of the select lever on the shift cable. When the select lever is in the automatic mode, the connecting lever member is inserted in the automatic mode range of the lever connecting hole such that the select lever and the cable bracket integrally move together, and if the select lever is converted to a manual mode, the connecting lever member is removed from the automatic mode range of the lever connecting hole such that the select lever and the cable bracket no longer integrally move together.

In the manual mode, the cable bracket must be fixed in the drive range. This is realized by the action of a detent spring formed on one side of the cable bracket and a detent plate formed on a main frame. However, the degree to which the cable bracket is secured in the drive range is dependent upon the operation of the elastic force of the detent spring on a groove of the detent plate. As a result, shaking or vibrations of the vehicle body can compromise the anchoring of the cable bracket in the drive range, possibly resulting in safety problems.

SUMMARY OF THE INVENTION

The present invention has been made in an effort to solve the above problem.

It is an object of the present invention to provide a shift/select lever unit for dual-mode automatic transmissions which is not affected by shaking and vibrations of the vehicle, and which securely fixes a cable bracket in a drive range when the select lever is in a manual mode.

To achieve the above object, the present invention provides a shift/select lever unit for a dual-mode automatic transmission. The shift/select lever unit includes a main frame mounted to a vehicle body; a select lever assembly movable between the automatic and manual modes to select one of the automatic and manual modes, the select lever assembly being shiftable in the automatic and manual modes to change drive modes and ranges; a shift cable bracket connected to a shift cable, the shift cable bracket being engaged with the select lever assembly when the select lever assembly is in the automatic mode and released from the select lever assembly when the select lever assembly is in the manual mode; and means for preventing the shift cable bracket from moving when the select lever assembly is in the manual mode.

According to a feature of the present invention, the shift cable bracket is provided with a select lever releasing/engaging hole, and the select lever assembly comprises a select lever pivotally mounted on the main frame and a connecting lever fixedly mounted on the select lever and extending toward the select lever releasing/engaging hole of the shift cable bracket, the connecting lever being located in the select lever engaging section when the select lever is in the automatic mode and located in the select lever releasing section when the select lever is in the manual mode.

According to another feature of the present invention, a detent plate is mounted on the main frame and having a plurality of grooves and a detent spring having a first end mounted on the bracket and a second end engaged with the grooves of the detent plate such that a suitable detent feeling is provided to the select lever assembly when the select lever assembly changes ranges in the automatic mode.

According to yet another feature of the present invention, the means for preventing the shift cable bracket from moving includes a push lever mounted on the select lever assembly and extending toward the shift cable bracket; and a flat spring mounted on the main frame and disposed between the push lever and the shift cable bracket, the flat spring being designed to be forced toward the shift cable bracket by the push lever when the select lever assembly is displaced to the manual mode, thereby preventing the shift cable bracket from moving in the manual mode.

According to still yet another feature of the present invention, the means for preventing the shift cable bracket from moving further comprises a stopper integrally formed on the push lever, the stopper being inserted into a stopper hole formed on the shift cable bracket when the select lever assembly is displaced to the manual mode.

According to still yet another feature of the present invention, the detent spring has a predetermined degree of elasticity to provide the detent feeling, is screw-coupled to the shift cable bracket, and is rounded on the second end engaged with the grooves of the detent plate.

According to still yet another feature of the present invention, a portion of the flat spring contacting the push lever is formed such that a larger area is provided for contact with the push lever when the select lever assembly is displaced from the automatic mode to the manual mode.

According to still yet another feature of the present invention, the select lever engaging/releasing hole has an automatic mode section and a manual mode section, the manual mode section being larger than the automatic mode section.

According to still yet another feature of the present invention, the connecting lever is provided at its extreme end within the select lever engaging/releasing hole with a sound absorbing member so as to prevent the generation of noise when the connecting lever associated with the select lever moves in the select lever engaging/releasing hole.

DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE INVENTION

Figure 1:
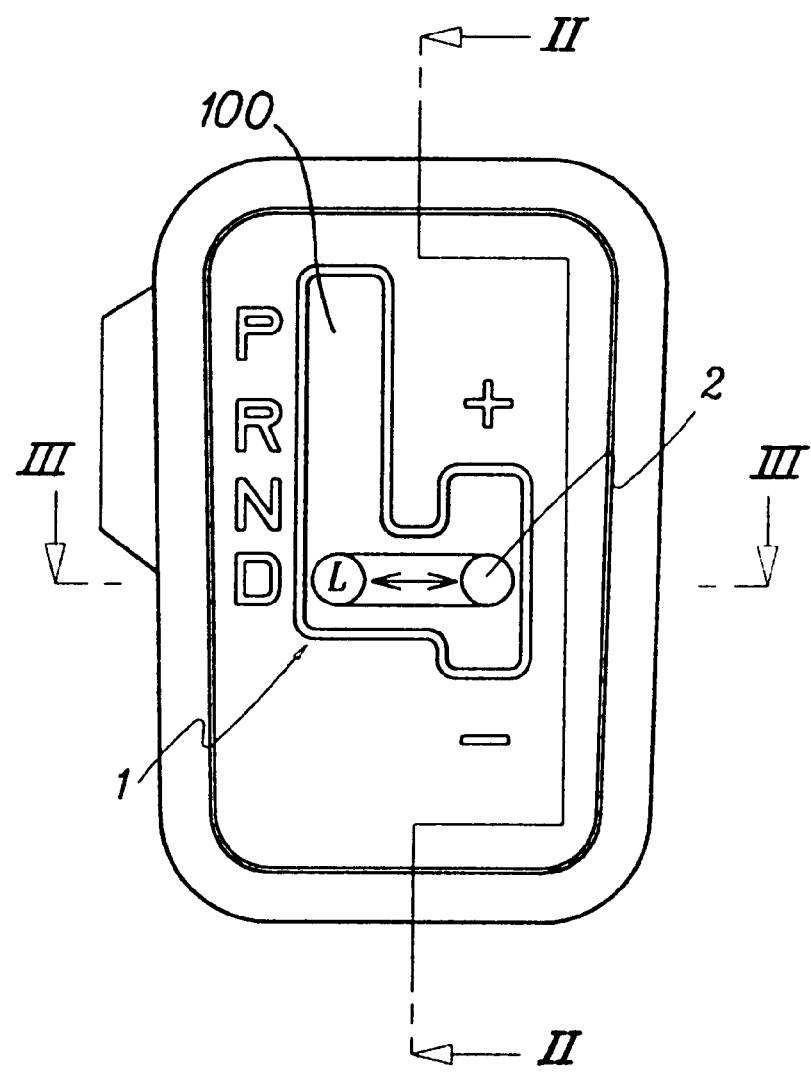
FIG. 1 is a top view of a select lever unit according to a first preferred embodiment of the present invention.

Preferred embodiments of the present invention will now be described in detail with reference to the accompanying drawings. Certain terminology will be used in the following description for convenience and reference only and will not be limiting. The words "right", "left", "top", "bottom", etc. will designate directions in the drawings to which reference is made.

FIG. 1 shows a top view of a select lever unit according to a first preferred embodiment of the present invention. Passing through a shift plate 1 of the select lever unit is a select lever 2. A passageway 100 is provided in the shift plate 1 and shift mode markers are illustrated on the shift plate 1 adjacent to the passageway 100. The shift mode markers include those corresponding to automatic shift control (i.e., P, R, N and D) and those corresponding to manual shift control (i.e., + and -). The user manipulates the select lever 2 in the passageway 100 to be positioned at one of the automatic shift modes, and, in the drive D range, controls the select lever 2 to the right and upward or downward respectively to the upshift (+) or downshift (-) marker to realize manual shifting. This will be described in more detail hereinafter.

Figure 2:
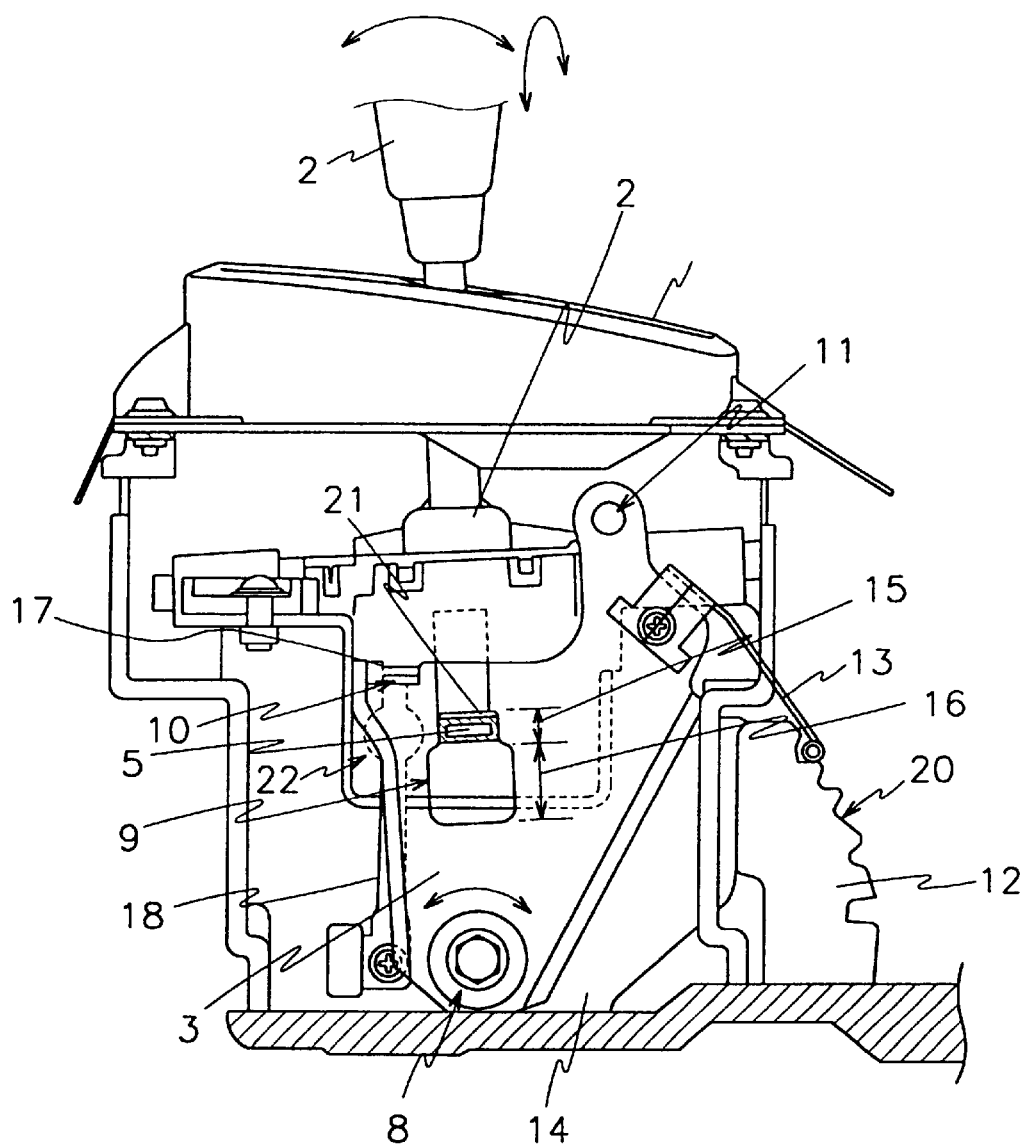
FIG. 2 is a sectional view taken along line II—II of FIG. 1.
Figure 3:
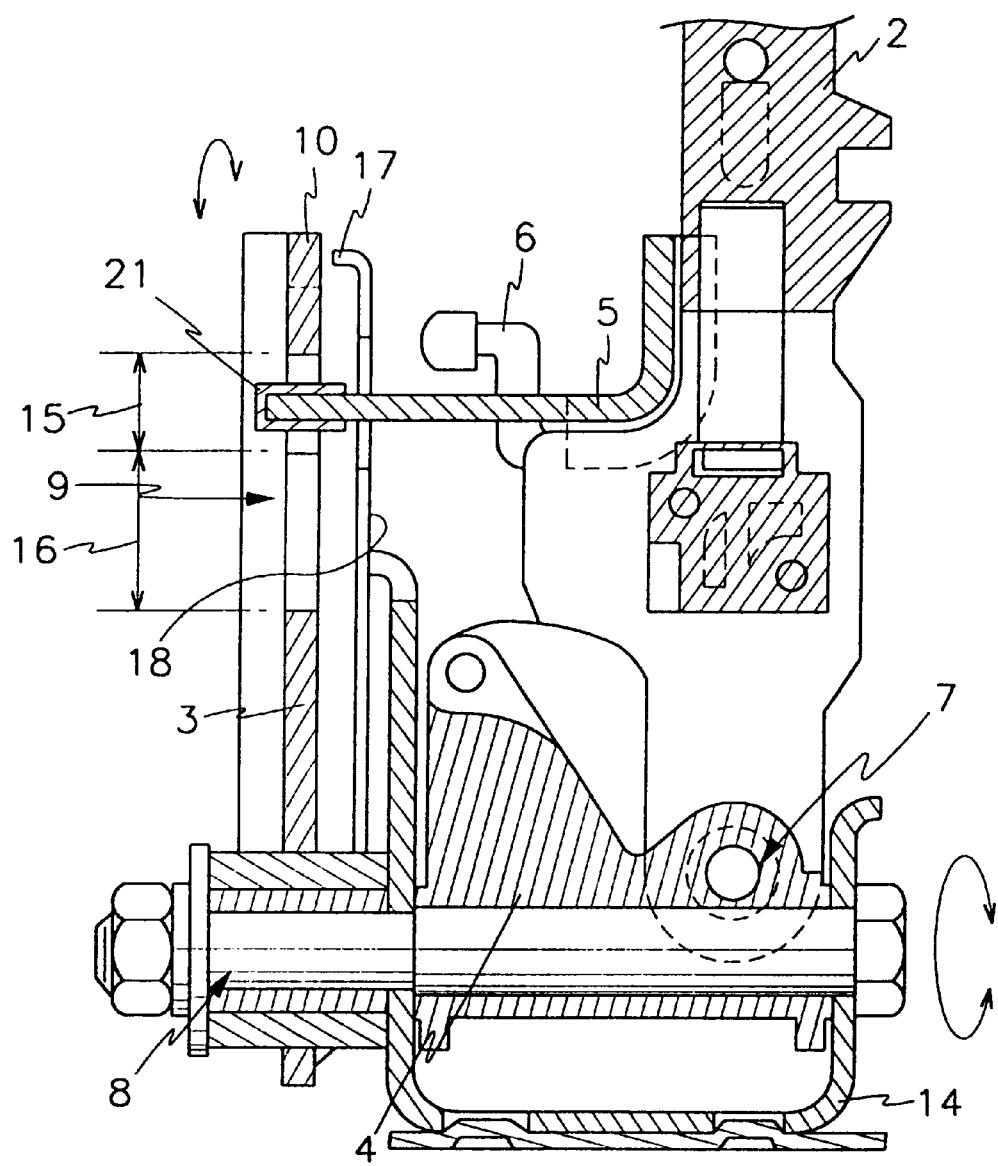
FIG. 3 is a sectional view taken along line III—III of FIG. 1 when a select lever is in an automatic mode.

FIG. 2 is a sectional view taken along line II—II of FIG. 1, and FIG. 3 is a sectional view taken along line III—III of FIG. 1. As shown in the drawings, a cable bracket 3 is provided on one side of the select lever unit under the shift plate 1 and the select lever 2 is vertically mounted inwardly from the cable bracket 3. A bottom end of the select lever 2 is rotatably mounted to a hinge 7 of a reciprocating frame 4, and both a connecting lever 5 and a push lever 6 are mounted to a side surface of the select lever 2.

The cable bracket 3 is rotatably connected to a hinge member 8, and includes a connecting lever hole 9 into which a distal end of the connecting lever 5 is inserted and a push lever or stopper hole 10 into which a stopper portion 17 of a flat spring 18 is inserted. The connecting lever 5 is inserted in the connecting lever hole 9 and the push lever 6 acts to insert the stopper portion 17 of the flat spring 18 in the push lever hole 10 to securely fix the select lever 2 to the cable bracket 3.

Further, a cable connector 11 is integrally formed in a top portion of the cable bracket 3, and one end of a shift cable (not shown), which is connected to a manual valve (not shown) of the automatic transmission, is joined to the cable connector 11. Connected to the cable bracket 3 in proximity to the cable connector 11 is a detent spring 13. When the shift lever 2 is manipulated in the automatic shift ranges, the detent spring 13 is engaged with one of a plurality of grooves 20 formed on a detent plate 12, the detent plate 12 being fixed to a main frame 14. Therefore, the combination of the detent spring 13 and the cable bracket 3 conveys a checking, detent feeling to the user when he or she manipulates the shift lever 2 to one of the automatic shift ranges.

The connecting lever hole 9 includes an auto mode section 15 and a manual mode section 16, the auto mode section 15 being smaller than the manual mode section 16. The connecting lever 5, cooperatively mounted to the select lever 2, is inserted in the auto mode section 15 when the selection lever 2 is positioned at one of the automatic shift mode markers such that the select lever 2 is fixed in its relative motion with respect to the cable bracket 3 in the radial direction about the hinge member 8. However, when the select lever 2 is in the manual mode, the connecting lever 5 is inserted in the manual mode section 16 such that the select lever 2 can be moved relative to the cable bracket 3 within the constraints of the wider manual mode section 16, thereby allowing the select lever 2 to be manually shifted to the upshift and downshift markers (+) and (-).

In the above, a sound absorbing member 21 is provided on an end of the connecting lever 5. The sound absorbing member 21 acts to reduce the sound generated by the connecting lever 5 making contact with the auto mode section 15 of the connecting lever hole 9. It is preferable that the sound absorbing member 21 is made of rubber or other such resinous material to enable the effective absorption of contact noise between the connecting lever 5 and the connecting lever hole 9.

A bottom end of the flat spring 18 is fixed to the main frame 14 and a top end of the flat spring 18 is bent to form a stopper portion 17. The stopper portion 17 of the flat spring 18 is inserted in the push lever hole 10 by the push operation of the push lever 6 associated with the select lever 2. Further, a dish-shaped plate 22 is integrally formed at a portion of the flat spring 18 contacting the push lever 6. With the formation of the dish-shaped plate 22, a larger area is provided for contact with the push lever 6 when the push lever 6 undergoes its push operation during shifting of the select lever 2 from the automatic mode to the manual mode.

Figure 4:
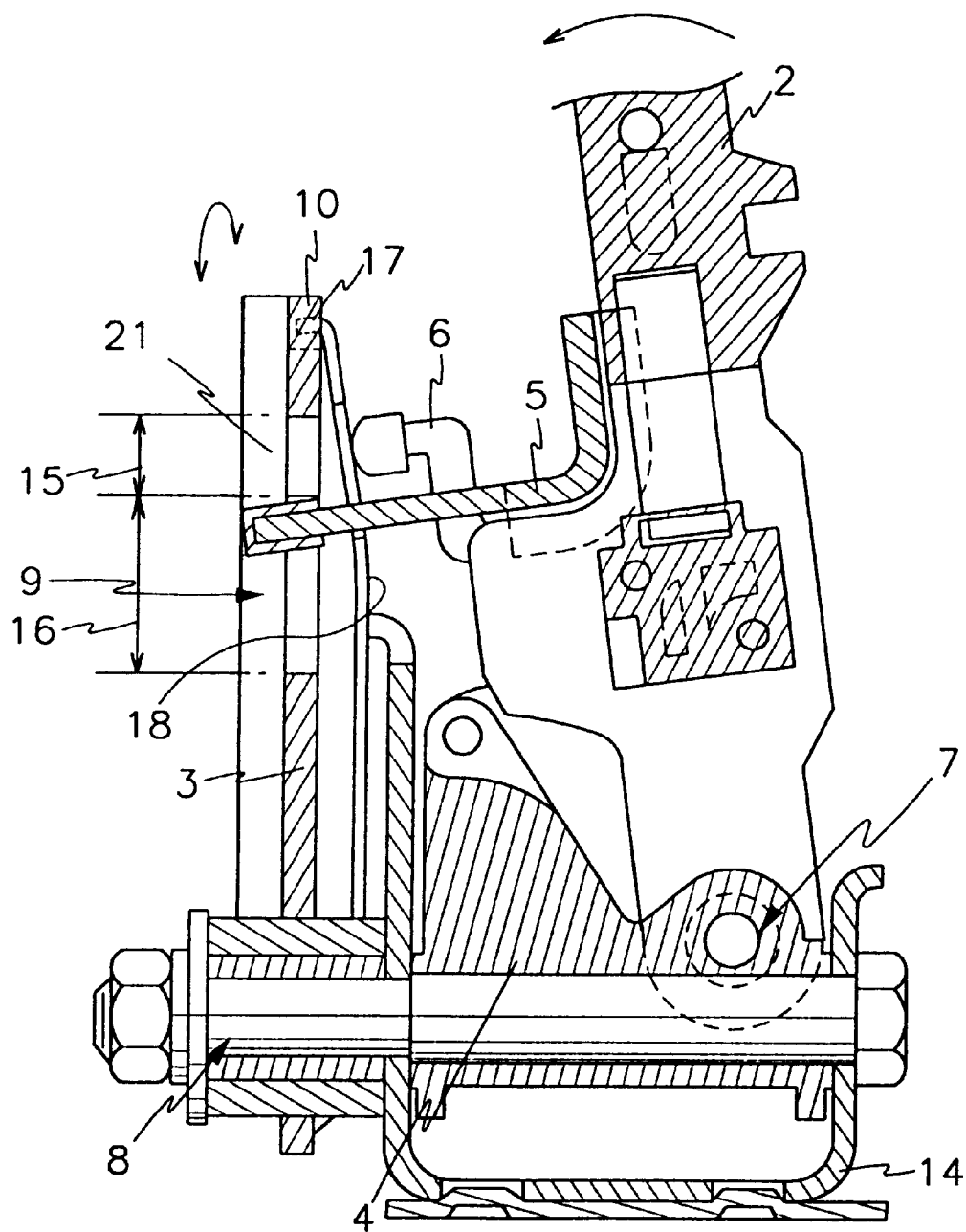
FIG. 4 is a sectional view taken along line III—III of FIG. 1 when the select lever is in a manual mode.

Accordingly, in the shift lock assembly for the select lever of the present invention structured as in the above, if the driver converts the select lever 2 from the automatic mode to the manual mode while in the drive range as shown in FIG. 4, the connecting lever 5, integrally formed to the select lever 2, is disengaged from the auto mode section 15 of the connecting lever hole 9 and engaged with the manual mode section 16 of the connecting lever hole 9. At the same time, the push lever 6 of the select lever 2 moves so that it pushes the flat spring 18 such that the stopper 17 of the flat spring 18 is inserted in the push lever hole 10 of the cable bracket 3. As a result, the flat spring 18, the bottom end of which is fixed to the main frame 14, firmly secures the cable bracket 3 in the drive range state such that the driver can reliably move the select lever 2 to the upshift marker (+) or the downshift marker (-) for upshifting and downshifting operations.

On the other hand, if the driver manipulates the select lever 2 to the automatic mode from the manual mode, the connecting lever 5, integrally formed to the select lever 2, is disengaged from the manual mode section 16 of the connecting lever hole 9 and engaged with the auto mode section 15 of the connecting lever hole 9 such that the select lever 2 is unable to move with respect to the cable bracket 3 in a radial direction about the hinge member 8. At the same time, the push lever 6 of the select lever 2 moves away from the flat spring 18 such that the stopper 17 of the push lever 6 is disengaged from the push lever hole 10 of the cable bracket 3 by the elastic force of the flat spring 18. As a result, the select lever 2 is able to operate the cable bracket 3 to each range in the automatic mode, with the operational force of the select lever 2 being transmitted by the connecting lever 5 and the connecting lever hole 9 to the auto mode section 15 of the cable bracket 3.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

For example, the sound absorbing member 21 is not provided on the end of the connecting lever 5. Instead, the connecting lever 5 is made of a material that produces minimal noise when engaging the connecting lever hole 9.

What is claimed is:

1. A shift/select lever unit for a dual-mode automatic transmission, the shift/lever unit comprising:
   a main frame for mounting to a vehicle body;
   a select lever means moveable between automatic and manual modes to select one of the automatic and manual modes, said select lever means being shiftable in the automatic and manual modes to change drive modes and ranges, said select lever means comprising a select lever pivotally mounted on the main frame, and a connecting lever fixedly mounted on the select lever;
   a shift cable bracket connected to a shift cable, said shift cable bracket being engaged with said select lever means when said select lever means is in the automatic mode and released from said select lever means when said select lever means in the manual mode, wherein said shift cable bracket comprises a hole comprising a first section and a second section, and wherein the connecting lever extends toward the hole, said connecting lever being located in the hole first section when the select lever in the automatic mode and located in the hole second section when the select lever is in the manual mode; and
   means for preventing the shift cable bracket from moving when said select lever means in the manual mode.

2. The shift/select lever unit of claim 1 further comprising a detent plate mounted on the main frame and having a plurality of grooves and a detent spring having a first end mounted on the bracket and a second end engaged with the grooves of the detent plate such that a suitable detent feeling is provided to said select lever means when said select lever means changes ranges in the automatic mode.

3. The shift/select lever unit of claim 1 wherein said means for preventing the shift cable bracket from moving comprises:
   a push lever mounted on said select lever means and extending toward said shift cable bracket; and
   a flat spring mounted on said main frame and disposed between said push lever and said shift cable bracket, said flat spring being designed to be forced toward said shift cable bracket by the push lever when said select lever means is displaced to the manual mode, thereby preventing said shift cable bracket from moving in the manual mode.

4. The shift/select lever unit of claim 3 wherein said means for preventing the shift cable bracket from moving further comprises a stopper integrally formed on the push lever, said stopper being inserted into a stopper hole formed on said shift cable bracket when the select lever means is displaced to the manual mode.

5. The shift/select lever unit of claim 2 wherein said detent spring has a predetermined degree of elasticity to provide the detent feeling, is screw-coupled to said shift cable bracket, and is rounded on the second end engaged with the grooves of the detent plate.

6. The shift/select lever unit of claim 3 wherein a portion of the flat spring contacting the push lever is formed such that a larger area is provided for contact with the push lever when said select lever means is displaced from the automatic mode to the manual mode.

7. The shift/select lever unit of claim 1 wherein the shift cable bracket hole first section is an automatic mode section and wherein the bracket hole second section is a manual mode section, the manual mode section being larger than the automatic mode section.

8. The shift/select lever unit of claim 1 wherein the connecting lever is provided at its extreme end within the bracket hole with a sound absorbing member so as to prevent the generation of noise when the connecting lever associated with the select lever moves in the bracket hole.

9. The shift/select lever unit of claim 3 wherein the flat spring comprises a stopper portion, said stopper portion being inserted into a stopper hole formed on said bracket when the select lever means is displaced to the manual mode.

10. A shift/select lever unit for a dual-mode automatic transmission, the shift/lever unit comprising:
    a main frame for mounting to a vehicle body;
    a select lever means moveable between automatic and manual modes to select one of the automatic and manual modes, said select lever means being shiftable in the automatic and manual modes to change drive modes and ranges;
    a shift cable bracket connected to a shift cable, said shift cable bracket being engaged with said select lever means when said select lever means is in the automatic mode and released from said select lever means when said select lever means in the manual mode; and
    a push lever mounted on said select lever means and extending toward said shift cable bracket; and
    a flat spring mounted on said main frame and disposed between said push lever and said shift cable bracket, said flat spring being designed to be forced toward said shift cable bracket by the push lever when said select lever means is displaced to the manual mode, thereby preventing said shift cable bracket from moving in the manual mode.

11. The shift/select lever unit of claim 10 further comprising a stopper integrally formed on the push lever, said stopper being inserted into a stopper hole formed on said shift cable bracket when the select lever means is displaced to the manual mode.

12. The shift/select lever unit of claim 10 further comprising a stopper integrally formed with the spring, said stopper being inserted into a stopper hole formed on said shift cable bracket when the select lever means is displaced to the manual mode.

13. The shift/select lever of claim 10 wherein a portion of the flat spring contacting the push lever is formed with a larger area section for being contacted by the push lever when said select lever means is displaced from the automatic mode to the manual mode.

14. A shift/select lever unit for a dual-mode automatic transmission, the shift/lever unit comprising:

a main frame for mounting to a vehicle body;

a select lever pivotally coupled to the main frame and moveable between automatic and manual modes to select one of the automatic and manual modes, said select lever being shiftable in the automatic and manual modes to change drive modes and ranges;

a connecting lever coupled to the select lever;

a shift cable bracket connected to a shift cable, said shift cable bracket being coupled with said select lever when said select lever is in the automatic mode and decoupled from said select lever when said select lever is in the manual mode, wherein said shift cable bracket comprises a hole comprising a first section and a second section, and wherein the connecting lever extends toward the hole, said connecting lever being located in the hole first section when the select lever in the automatic mode and located in the hole second section when the select lever is in the manual mode; and means for preventing the shift cable bracket from moving when said select lever means in the manual mode.

15. A shift/select lever unit for a dual-mode automatic transmission, the shift/lever unit comprising:

a main frame for mounting to a vehicle body;

a select lever moveable between automatic and manual modes to select one of the automatic and manual modes, said select lever being shiftable in the automatic and manual modes to change drive modes and ranges;

a shift cable bracket connected to a shift cable, said shift cable bracket being coupled with said select lever when said select lever is in the automatic mode and decoupled from said select lever means when said select lever in the manual mode; and a push lever coupled to the select lever and extending toward said shift cable bracket; and a flat spring coupled to said main frame and disposed between said push lever and said shift cable bracket, said flat spring being designed to be forced toward said shift cable bracket by the push lever when said select lever is displaced to the manual mode, thereby preventing said shift cable bracket from moving when in the manual mode.

* * * * *